United States Patent [19]

Potenzone

[11] Patent Number: 4,879,625

[45] Date of Patent: Nov. 7, 1989

[54] VOLTAGE MONITOR

[76] Inventor: Richard A. Potenzone, 20675 SW. 162 Ave., Miami, Fla. 33187

[21] Appl. No.: 131,852

[22] Filed: Dec. 11, 1987

[51] Int. Cl.[4] ............................................. H01H 5/20
[52] U.S. Cl. ........................................ 361/90; 361/91; 361/92; 207/130; 340/661; 340/662; 340/663
[58] Field of Search ....................... 361/88, 60, 91, 92, 361/103; 207/129, 130; 342/660, 661, 662, 663

[56] References Cited

U.S. PATENT DOCUMENTS

| | | | |
|---|---|---|---|
| 3,512,044 | 8/1967 | Jones | 317/16 |
| 3,551,746 | 12/1970 | Rubner | 317/26 |
| 3,800,198 | 3/1974 | Graft et al. | 321/5 |
| 4,142,372 | 12/1980 | Sears | 361/72 |
| 4,160,282 | 7/1979 | Dolinar et al. | 361/31 |
| 4,202,023 | 5/1980 | Sears | 361/18 |
| 4,331,996 | 5/1982 | Matsko et al. | 361/92 |
| 4,368,499 | 1/1983 | Stifter | 361/90 |
| 4,443,709 | 4/1984 | Genuit et al. | 207/192 X |
| 4,532,570 | 7/1985 | Thornley et al. | 361/93 |
| 4,541,029 | 9/1985 | Ohyama | 361/31 |
| 4,663,539 | 5/1987 | Sharp et al. | 361/90 X |
| 4,742,424 | 5/1988 | Kautzer et al. | 307/129 X |

Primary Examiner—Derek S. Jennings
Attorney, Agent, or Firm—Oltman and Flynn

[57] ABSTRACT

Voltage monitor for monitoring the output voltage of a power source which can be connected to a power load, which includes a reference voltage source, comparators for comparing the power source voltage with the reference voltage, switches between the power source and the load, which can be controlled by an output from the comparators, such that the switches can be closed only when the power source voltages are within certain voltage limits and meet certain conditions, and also such that the load is disconnected when the power source voltages go beyond certain voltage or frequency limits. A timing circuit may also be provided for timing various voltage conditions.

18 Claims, 3 Drawing Sheets

VOLTAGE MONITOR

BACKGROUND OF THE INVENTION

The invention relates to devices for monitoring electric power sources and more particularly to devices for monitoring the voltage of such a power source and disconnecting it and/or preventing it from being connected when the source voltage fails to meet a given set of criteria.

PRIOR ART

Several power line monitoring devices are known which monitor a power line connected to a load and operate to disconnect the line if the current flowing into the load exceeds certain limits. Such devices have long been known and used in the form of thermal fuses and circuit breakers.

Other devices are known which monitor current and voltage being applied to a load which exceeds or falls below certain values. One such device is described in U.S. Pat. No. 4,541,029, which monitors current and voltage being applied to a load, and trips a disconnect device whenever the operating current and voltage are deviating from present values for a present length of time.

Several other inventors have disclosed apparatus for protecting electrical loads against damage or faulty operation in cases of improper operational behavior of a power source during its operation. It has been found, however, that none of the known load-protecting devices take into account the problems arising from connecting a load to a power source wherein the voltage before connecting the load to the source is such that damage to the load may occur after being connected, or interference with the power source takes place to such a degree that stable operation is impossible or hindered.

The aforesaid problem is especially noticeable and annoying in cases wherein a power source in the form of a motor generator, driven, for example, by an internal combustion engine having a limited load carrying capacity, and is connected to a load of a magnitude that is relatively large compared to the capacity of the generator. In such cases considerable voltage variations are normally encountered when the load is connected to the source.

SUMMARY OF THE INVENTION

In order to overcome the problems of the prior art devices, a voltage monitor, according to the invention is provided which includes a heavy duty relay, contactor or switch disposed between a load and a power source, controlled by a control circuit having an input connected to the power source and an output for controlling the heavy duty relay, means for monitoring the source voltage, means for comparing the source voltage against reference voltages provided for example by the control circuit, and producing a comparator output, timing means for monitoring the comparator output and trigger means responsive to the timing output for controlling the heavy duty relay to connect and/or disconnect the load in case the source voltage is found to be outside certain selected limits for certain selected durations.

In accordance with another feature the voltage monitor operates to prevent the load from being reconnected to the source if the source voltage is above a certain upper limit or below a certain lower limit before a given selectable time has elapsed.

In accordance with another feature, the monitor continues to monitor the voltage after the load has been connected, and in this state, again disconnects the load, if the voltage exceeds a certain upper limit or falls below a certain lower limit for a timed duration.

In accordance with still another feature the timed duration for disconnect in response to high voltage above a given limit is very short, while the timed duration for low voltage below a certain limit is considerably longer.

In accordance with still another feature the upper and lower voltage limits are selectively adjustable, and the timed duration for only the low voltage condition is adjustable while the upper voltage time duration is as short as possible.

In accordance with still another feature the monitor uses as disconnect devices a solid-state relay which is capable of precise timing and wherein the monitor circuit is contained in a metal housing having the heat sinks for the solid-state switch mounted externally to the housing for maximum heat dissipation, yet allowing the components of the timing and monitoring circuits to be mounted well protected against moisture and dust inside the housing.

In accordance with still another feature, the timing for the low-voltage tripping is selected such as to allow for dips in the voltage caused by motors and other loads being started.

In accordance with still another feature there is no delay on the high-voltage trip.

In accordance with yet another feature a slight differential is provided in the on-off voltage tripping levels to prevent "voltage hunting" or oscillation upon connection, disconnection and reconnection of the load.

In accordance with still another feature the monitor reconnects the load to the source when the voltage after tripping returns to normal.

In accordance with still another feature, timing is provided to prevent resetting of the timer until after the voltage has returned to normal for a time interval being typically at least 8 seconds, with timing being adjustable to any suitable higher value.

In accordance with still another feature the voltage tripping points are measured with precision using a comparator having one comparator input referenced to a stabliized, very precise voltage reference, and another comparator input monitoring the source voltage. The reference voltage may also be temperature stabilized.

In accordance with still another feature, the monitor input is capable of sensing and withstanding at least 230 volts to prevent damage in case of mis-connection of the power lines.

A high voltage condition may occur in case the neutral line should be open or floating. The voltage monitor protects against this condition and has built-in surge protectors.

In accordance with still another feature the monitor can be connected with a remote voltage metering panel.

In accordance with a still further feature, the monitor has a frequency sensing element that senses the frequency of the power source, compares it with a frequency reference and acts upon the monitor control to prevent the load from being connected if the source frequency is outside given frequency limits.

Further objects and advantages of this invention will be apparent from the following detailed description of a presently preferred embodiment which is illustrated schematically in the accompanying drawings.

Before explaining the disclosed embodiment of the instant invention in detail it is to be understood that the invention is not limited in its application to the details of the particular arrangements shown since the invention is capable of other embodiments. Also, the terminology used herein is for the purpose of description and not of limitation.

DESCRIPTION OF THE PREFERRED EMBODIMENT

Figure 1:
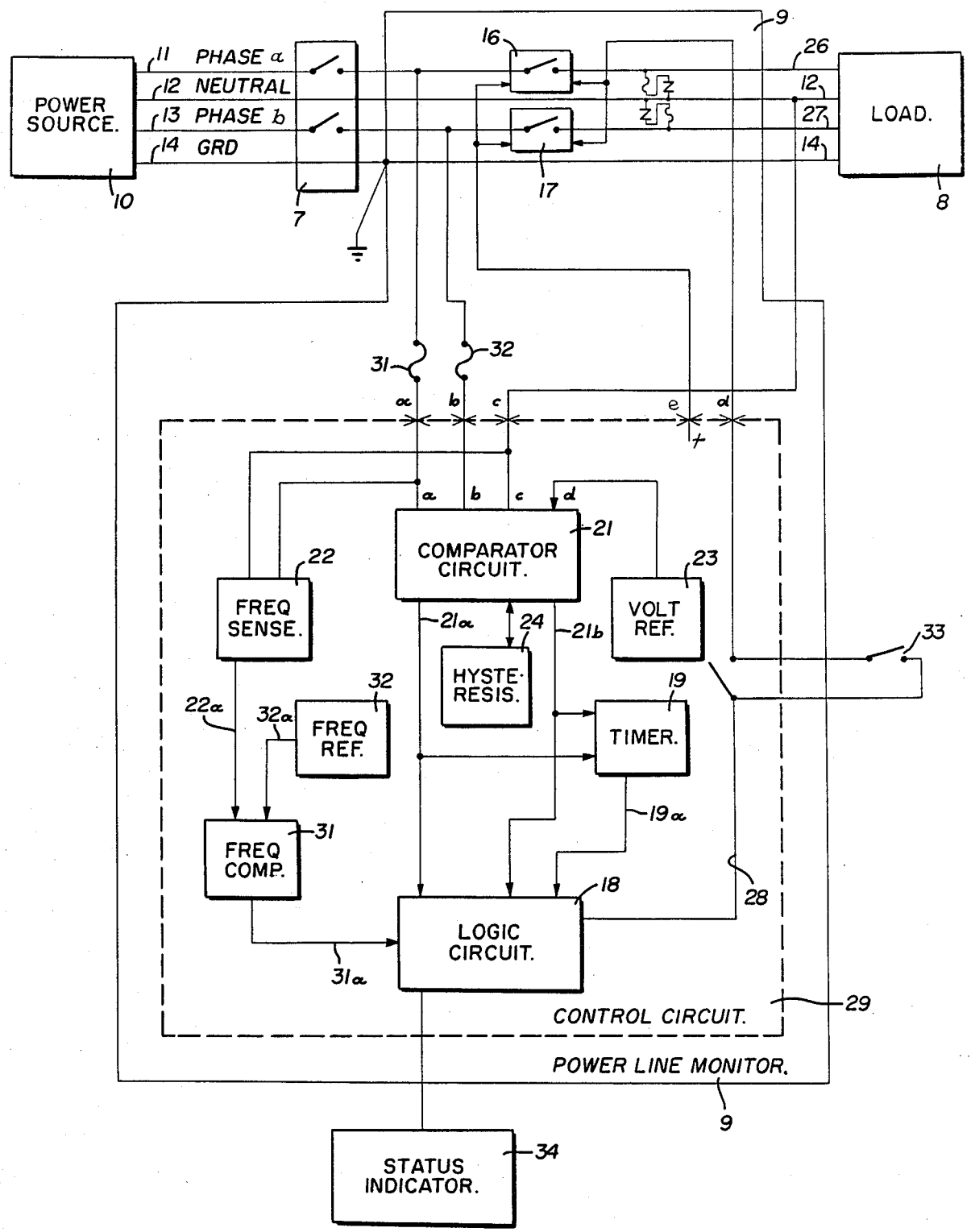
FIG. 1 is a block diagram of the invention showing its major building blocks.

FIG. 1 is a block diagram of the invention showing its major building blocks, wherein a power source 10 provides power on the phase leads 11 and 13, having a common neutral lead 12 and a common protective ground 14. The voltage between the two phase leads 11 and 13 is typically 230 volts ac, and the voltage from each phase lead to neutral 12 is typically 115 volts, but these voltages can, under certain circumstances, vary considerably. A load 8 is connectable at least to one of the phases through circuit breakers 7 and a contactor being part of the power line monitor 9, having two heavy duty switches 16 and 17, controlled by a common switch control line 28. The switches 16 and 17 have a power handling capacity sufficient to make and break the power to the load 8. The load 8 is typically a 115 volt ac-load. The heavy duty switches 16 and 17 are advantageously of the solid-state type, using for example controlled rectifiers optically coupled to the control line 28, by an LED-phototransistor coupling element built into the contactor assembly.

A switch control circuit 29, shown inside dashed lines, is connected to the switches at points a, b, c and d and serves to monitor the voltage at the input leads 11, 12 and 13 before and after the switches 16, 17 are closed and power is applied to the load 8 for the purposes of insuring safe operation.

The control circuit 29 may, in addition to monitoring the voltages also monitor the frequency of the ac-voltage from the power source 10, since the frequency is, under a number of operating conditions also important, for example when motors are being operated.

The control circuit 29 has a comparator circuit 21 having two inputs a and b respectively connected to phase lead 11 and neutral 12 through protective fuses 31,32 and an input C connected to the neutral lead 12. The comparator circuit 21 is also connected to a voltage reference circuit 23, used by the comparator circuit 21 to provide, by comparison, upper and lower voltage limits of the voltage source 10 and to prevent the switches 16 and 17 from connecting the load, or disconnecting the load in case the voltages go beyond the set limits.

The output leads 21a and 21b from the comparator 21 are connected to a timer 19 and a logic circuit 18. The timer 19 and the logic circuit 18 together form the decisions governing the conditions under which the switches 16 and 17 are connected or disconnected by means of the switch control lead 28 connecting the output of the logic circuit 18 with the control input of the switches 16,17.

Since the act of connecting the load 8 to the power source 10 often affects the voltage on the power leads 11,12 an instability known as oscillating or hunting may take place immediately after the load 8 is connected to the source 10, especially if the voltage levels are near their limit values, a hysteresis circuit 24 may be connected to the comparator circuit 21. The hysteresis circuit 24 prevents such instability by inserting a certain amount of hysteresis in the control loop, which operates to eliminate the instability, as explained in more detail hereinbelow.

In addition to the voltage levels, the frequency of the power source is also under some circumstances an important control variable. An optional frequency-sense circuit 22, advantageously in the form of a phase-locked loop is connected with its output lead 22a to one input of a frequency comparator 31, having its other input 32a connected to a frequency reference 32. When the frequency of the power source 10 is found to be outside certain set frequency limits, the load 8 will not be connected, or if already connected, it will be disconnected by the logic circuit 18.

A switch 33 may be provided in the control lead 28, to manually control the output of the control circuit 29; and a status indicator 34 may be provided to give a visual indication of the status of the control circuit 29.

Figure 2:
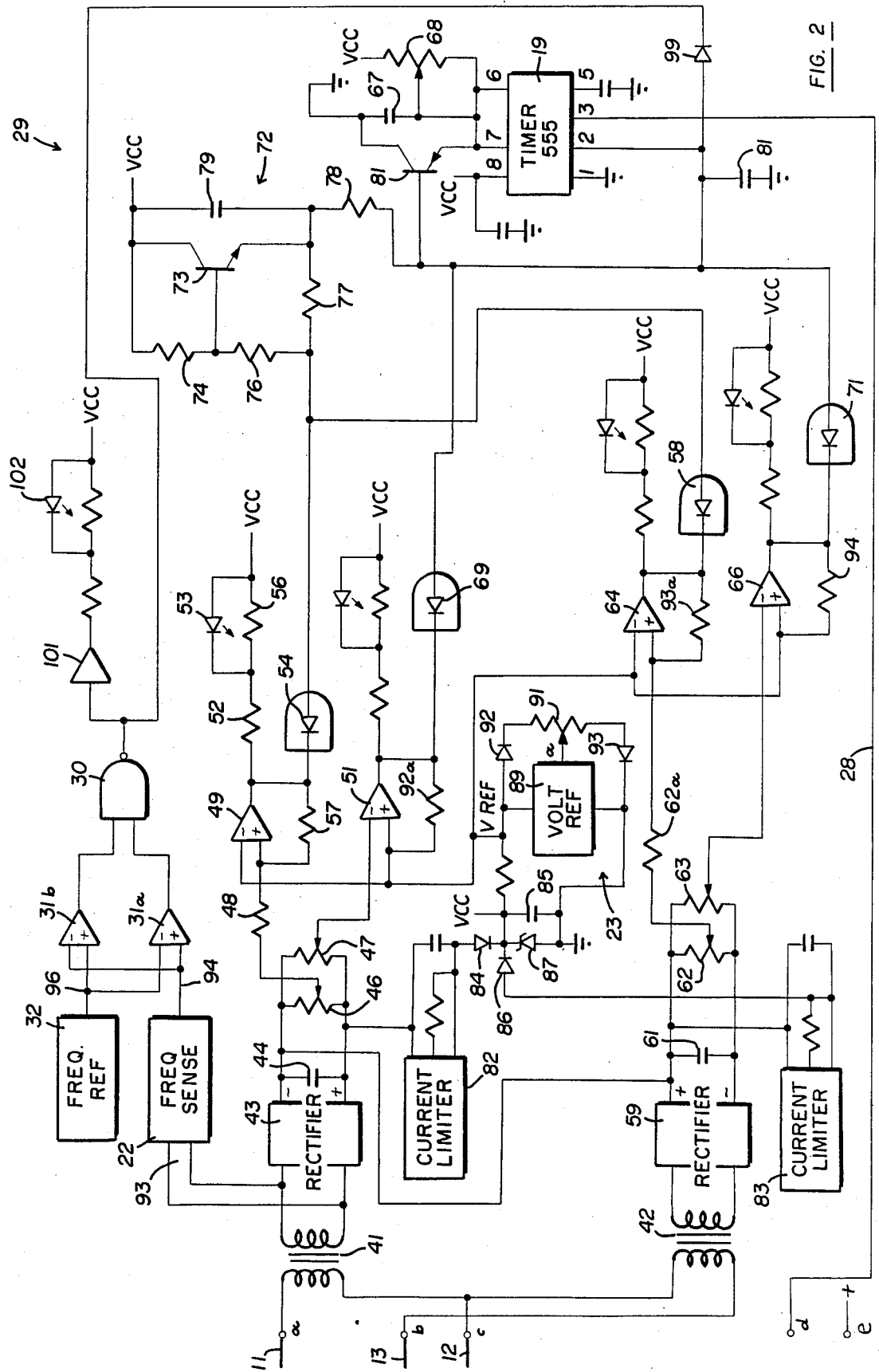
FIG. 2 is a schematic circuit diagram of the control part of the invention showing its major circuit elements and their components.

FIG. 2 is a detailed circuit diagram of the control circuit 29, which shall be described in more detail in the following.

The input pins a, b and c, connected under normal operating conditions to the respective phase leads 11 and 13 and neutral lead 12 of the power source 10, are connected to the series connected input windings of two stepdown transformers 41,42, having their common lead connected via pin c to the neutral lead 12.

Pins d and e respectively supply controlled +and −5 volts to drive the switches 16 and 17.

Describing now first the circuit connected to pin a, monitoring phase lead 11, the input transformer 41 is connected with the secondary winding to a fourway bridge rectifier 43, having output leads + and − connected to a filter capacitor 44 and to the end terminals of two potentiometers 46,47 having their respective sliding contacts connected to the respective direct and inverted input of operational amplifiers 49, and 51. These amplifiers, operating as comparators have their respective inverted and direct inputs connected to reference voltage VREF provided by a voltage reference circuit 23, providing a highly stable voltage, set precisely and maintained independently of input temperature and voltage fluctuation, to a value of 2.5 volts. The two comparators 49,51 are of a type well known e.g. as LM-339 or the like. The comparator 49 is set to monitor the lower limit of the ac voltage at the phase lead 11, which is proportional to the voltage across the potentiometer 46. The sliding contact of potentiometer 46 is set to a voltage that is closely equal to 2.5 volts, when the voltage at pin a is equal to the lower voltage limit for lead 11. In other words, for an acceptable voltage to be present at pin a, the voltage thereof must be higher than the lower limit, and accordingly, the output of the comparator 49 must be at a positive logic level, corresponding to a logic condition equal to logic one or "high". The output of comparator 49 is connected to the cathode of a diode 54 forming one input of a four input AND-gate, drawn symbolically around the diode, having three other inputs formed by the diodes 58,69 and 71, also shown as having a symbolic AND-gate drawn around them. The comparators 51 and 49 monitor pin a in reference to pin c. It has its having input connected with the sliding contact of potentiometer 47, which is adjusted such that the output of comparator 51 is at logic 1 ("high") when the voltage at pin c is below its upper limit, which is, again, determined by a comparison with the reference voltage VREF connected to the direct input of comparator 51. Summarizing briefly, when the ac voltage at pin a is above its lower limit and below its upper limit both comparators 49 and 51 will have an output at logic 1.

The upper and lower voltage limits at pin b with respect to pin c are monitored in similar manner by comparators 64 and 66. The comparator 64 connected to AND-gate diode 58 monitors the lower voltage limit at pin c, connected under normal operating conditions to the neutral lead 12, which, under normal operating conditions has a low ac-potential typically a few volts ac connected thereto, but lead 12 may also, at times, be erroneously connected to one of the phase leads instead of neutral, for example to the phase lead 13.

If such a connecting error is made, the voltage across pins a and c will be 230 instead of 115 volts and if a connection is made to the load 8, clearly extensive damage can be made to the load. In order to assure that the voltage present at pins a and c is proper and safe, it is therefore also necessary to monitor pin c to assure that its voltage is within safe upper and lower limits. This monitor function is provided by the input transformer 42, connected similarly as transformer 41, to a rectifier bridge 59, in turn connected via filter capacitor 61 to potentiometers 62 and 63 having their sliding contacts connected respectively to the direct input of comparator 64 through resistor 62a and the inverting input of comparator 66, which respectively monitors the lower and the upper limit of the voltage of the neutral lead 12, in a manner similar to that described above for the monitoring of the limits on lead 11 at pin a.

Accordingly, when the voltage at phase lead 11, at pin a is within its proper lower and upper limits set at the respective potentiometers 46 and 47, and the voltage at the neutral lead 12 is within its proper lower and upper limits as determined by the respective potentiometers 62 and 63, all four comparators 49,51,64 and 66 will show a logic high at their output, thereby enabling the AND-gate consisting of AND-gate diodes 54,69,58 and 71, connected with their cathode to the respective comparator output, and the anode of each of the four diodes will go high. On the anode side, the four AND-gate diodes are divided into two groups, namely diodes 54 and 58 having common anodes that go high quickly, but go low slowly due to the construction of the AND-gate current feed circuit 72, consisting of NPN-transistor 73 having a capacitor 79 between collector and emitter, plus supply voltage VCC at its collector and resistors 74 and 76,77 respectively connected between collector-base and base, emitter, with the AND-gate output of diodes 54 and 58 connected to the junction between resistors 76 and 77. A second AND-gate current feed resistor 78 taken from the emitter of transistor 73 feeds the diodes 69 and 71, forming the second diode anode group of the four input AND-gates.

Accordingly, if both leads 11 and 13 have a voltage above their respective lower limit and below their upper limit as being a condition for proper operation, all four inputs of the AND-gate 54,69,58 and 71 will go high insuring that the common output of the entire AND-gate is also high. The high output of the AND-gate triggers a timer 19 on, causing the timer's output pin 3, connected to the switch control lead 28 to go low and operate the switches 16,17 to connect the power source 10 to the load 8. The timer 19 is advantageously a so-called 555 integrated circuit timer, which is a monostable flip-flop that maintains its output in the high state for a given length of time, after it has been triggered, which is determined by the time constant of capacitor 67 and the adjustable resistance of potentiometer 68, both connected to the commonly connected pins 6 and 7 of the 555 timer.

Under normal operating conditions when input power is connected to the input of the control circuit, if the input voltages are within their proper limits, the timer 19 will be reset and operate switches 16 and 17 to connect the power source 10 to the lead 11. If during operation, the voltage on one of the leads 11 and 13 should momentarily go above the set voltage limit, the load will be quickly disconnected and no damage will be done to the load circuit. If the voltage, after disconnect comes down again to the proper level, the switches will again be connected after a short delay caused by a capacitor 67 forming a time constant with resistor 78.

If during operation, the voltage should momentarily dip to a level below the lower limit, the timer 19 will maintain the switches 16 and 17 closed for a length of time, set by the RC-network consisting of resistor 78 and capacitor 79 with the transistor 73 used to short capacitor 79 and keep it from charging up again during a low voltage condition. This is only the low voltage circuit and is not adjustable. If the voltage should stay low for a length of timer longer than the holding time of the timer 19, the switches 16 and 17 will be disconnected.

The control circuit according to the invention has a number of features that are important for successful operation of the circuit, as will be described in the following.

The monitor circuit must be capable of operation under conditions wherin ac-voltage is present at either pin a or b, or on both of them. Each transformer 41 and 42 with their respective rectifiers 43 and 59 therefore supplies operating current through respective current limiters 82 and 83, which are conventional current limiter circuits of the known type LM-317 or the like, and supply current through two respective voltage-combining diodes 84,86, connected at their common cathode to a filter capacitor 85 in parallel with a five volt zener diode 87, which provides a constant supply voltage VCC of five volts to the entire monitor circuit, and also furnishes current for the reference voltage circuit 23, which includes a conventional voltage reference circuit, e.g. type LM-336, having a temperature compensating input a connected to the sliding contact of a potentiometer 91, connected between reference voltage VREF and ground through respective diodes 92 and 93.

Figure 3:
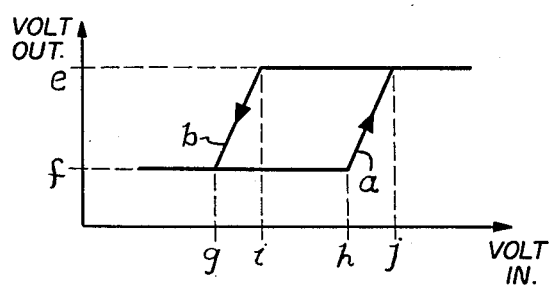
FIG. 3 is a hysteresis diagram for the invention.

In order to provide hysteresis, each of the four comparators 49,51,64 and 66 has a small amount of positive feed-back supplied through respective feed-back resistors 57,92 93a and 94a connecting the comparator output with its non-inverting input in conventional manner. The effect of the hysteresis is shown in FIG. 3, showing the comparator input voltage on the horizontal axis, and the output voltage on the vertical axis. As the input voltage increases through points g, i,h,j, the output voltage rises quickly along leg a from f to e, and when the input voltage later goes back through points j, h,i,g, the output voltage goes back through leg b, from e to f. In this way minor input variations in the range from i to h do not cause any variation in the comparator output.

In accordance with another feature, the current limiters 82 and 83 are set to have a certaing small difference in current through them. This difference serves to overcome a faulty input condition wherein the neutral lead 12 has not been connected to ground as required for proper operation. Without the aforesaid difference, equal voltages would be developed on the two transformer secondary windings. The entire circuit would remain operative but with the aforesaid difference, pin c being left floating by the missing neutral connection, one of the current limiters will present a greater load than the other, so that in the event that the neutral 12 is left open and leads 11 and 13 are in different phases, the circuit would function, but the voltages at 43 and 59 would be different. This will offset the voltage enough to trip one side on high and the other side on low. This is the feature which detects a floating or open neutral, and is a very important feature, since clearly a great deal of damage would be done to the load circuit if 230 volts is connected to its series-connected parts with the neutral lead 12 being open or floating, instead of 115 volts.

Each comparator 49,51,64 and 66 has an indicating circuit, consisting of their resistors 52,56 and a light-emitting diode 53 connected to supply voltage VCC, which, when the comparator output is low draws enough current through the light-emitting diode 53, to give a visible light indicating a fault condition for the respective comparator, so that a service person can quickly, with a glance at the light-emitting diodes, ascertain the fault condition.

A frequency sensing circuit 22 is connected with its input to the secondary winding of for example the transformer 41. The frequency sensing circuit 22 produces an output voltage at output 94 that is proportional with the input frequency. A frequency reference circuit 32 produces an output dc-voltage at output 96 that is equal to the voltage at output 94, plus or minus a small increment d, when the input signal has the correct frequency, i.e. typically 60 Hz. A pair of comparators 31a and 31b has the reference voltage 96 connected to the inverting and straight inputs of the respective comparators and the frequency sense output 94 connected to the straight and inverting output of the respective comparators. The comparator outputs are connected to the inputs of an AND-gate 30.

Figure 4:
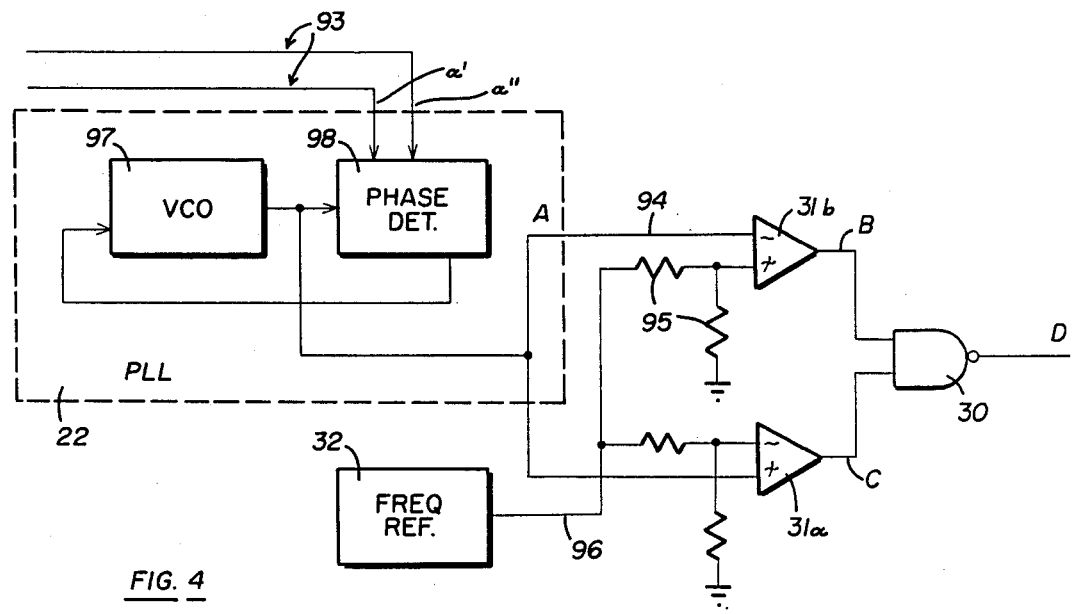
FIG. 4 is a schematic circuit diagram showing circuit details of the frequency sensing circuit.
Figure 5:
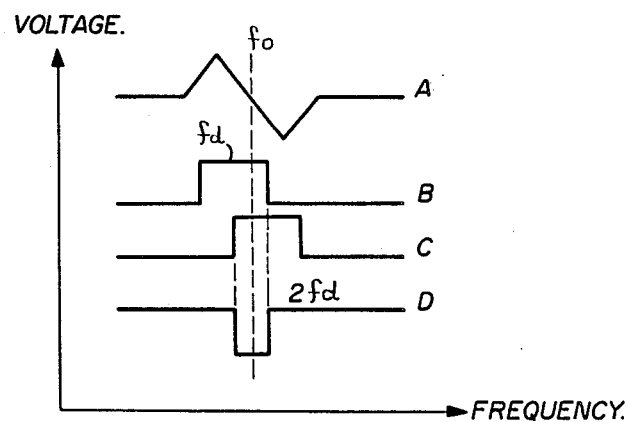
FIG. 5 is a voltage-frequency diagram of the frequency sensing circuit.

FIGS. 4 and 5 show further details of the frequency monitor circuit, wherein the frequency sensing circuit 22 is a conventional phase-locked loop (PLL) having a voltage-controlled oscillator (VCO) 97 connected with its output to one input of a phase detector 98, having at its other input a', a'', a connection 93 to the secondary winding of the transformer 41. The output 94 of the phase detector carries a voltage generated by the VCO 97, shown in FIG. 5, detail A which is a function of the input frequency in relation to the center frequency fo of the PLL. With the input frequency 93 being equal to the center frequency fo of the PLL, the output A at 94 is equal to zero, as shown. The frequency reference 32 is set to an output voltage D, such that a frequency band equal to fd is defined to each side of the center frequency fo, resulting in a true output D of logic zero from the NAND-gate 30 corresponding to the frequency band 2fd around the frequency fo. As seen in FIG. 2 the output of the NAND-gate 30 is connected via the diode 99, facing the diode's cathode, to pin 2 of timer 19, which will prevent the timer from operating and connecting the power source to the load. As a result, if the frequency of the power source 10 is inside the frequency band 2fd, the switches will be allowed to be closed, and conversely, if it is outside that band they will not be allowed to be closed. A visual indicating LED 102 may be connected to the exclusive AND-gate 30 via an amplifier 101 to indicate if the input frequency is in the acceptable frequency range, by being lighted.

Another feature of the control circuit 29 is a transistor 81 being connected with its emitter to pins 7 and 6 of the timer 19, its collector to ground and its base to the AND-gate lead connected to the timer input pin 2. The transistor 81 serves to maintain the timing capacitor 67 discharged whenever the input to the timer goes to zero, thereby insuring that the timer's time delay always starts from zero.

I claim:

1. Voltage monitor for monitoring the output voltage of a power source being connectable to a load through at least two phase leads and a neutral lead, comprising: a reference voltage source, comparator means for comparing the output voltage with said reference voltage for producing an affirmative output if said output voltage is within a given range of said reference voltage, and switch means including a switch in each of said phase leads being responsive to said affirmative output for connecting said load to said power source.

2. Voltage monitor for monitoring the output voltage of a power source being connectable to a load, comprising: a reference voltage source, comparator means for comparing the output voltage with said reference voltage for producing an affirmative output if said output voltage is within a given range of said reference voltage; and switch means being responsive to said affirmative output for connecting said load to said power source. Wherein said power source includes at least one phase lead, a neutral lead and a ground lead; said comparator means has at least one phase input being responsive to the voltage on said phase lead, and a neutral input being responsive to the voltage on said neutral lead; said switch means include at least one switch disposed in said phase lead between the load and the power source, and a ground lead connecting said power source with said monitor and said load.

3. Voltage monitor according to claim 2 wherein said switch is a solid-state switch.

4. Voltage monitor according to claim 3 including timing means for timing the duration of presence of a given voltage condition respectively on said phase lead and said neutral lead.

5. Voltage monitor circuit according to claim 4 including a logic circuit being operatively responsive to said comparator and said timing means for producing said affirmative output.

6. Monitor circuit according to claim 2 including hysteresis means in operative engagement with said comparator circuit for providing hysteresis in said comparator circuit.

7. Monitor circuit according to claim 2 wherein said comparator means include a low limit and a high limit comparator for said phase lead and a low limit and a high limit comparator for said neutral lead.

8. Monitor circuit according to claim 7 including a logic circuit being responsive to said comparators for producing said affirmative output in response to the condition that the output voltage of said phase lead and the neutral lead each is within said low and said high limits.

9. Voltage monitor according to claim 8 including an AND-gate having an input responsive to each comparator output for producing said affirmative output in response to each AND-gate input having a true logic state thereon.

10. Voltage monitor according to claim 9 wherein said AND-gate inputs are divided into a high and a low input group respectively being responsive to a low and a high power source output inputs, each group having a respective low and high AND-gate output; fast timing means being responsive to said high AND-gate output for quickly cancelling said affirmative output in response to a high-condition above said upper limit being present at said power source output and slow timing means having a given longer delay time being responsive to said low AND-gate output for cancelling said affirmative output in response to a low condition below said lower limit being present at said power source output for a duration beyond said longer delay time.

11. Voltage monitor according to claim 7 including a first input transformer disposed between said comparators and said phase lead and a second input transformer disposed between said comparators and said neutral lead, said first and second input transformers having different current loading for detecting absence of ground connection to said monitor.

12. Voltage monitor according to claim 11, including a recitifier connected to the secondary winding of each input transformer, at least two potentiometers connected to each secondary winding for setting the high and low limit for the respective input transformer.

13. Voltage monitor according to claim 12, including a voltage supply circuit connected to each rectifier through respective combining diodes.

14. Voltage monitor according to claim 13, including a voltage reference circuit for supplying a constant reference voltage, having a temperature compensating input and a temperature compensating potentiometer, having a sliding contact connected to said temperature compensating input.

15. Voltage monitor according to claim 14 including a current limiter disposed in series with each combining diode.

16. Voltage monitor according to claim 3 including a metal housing for enclosing said voltage monitor, wherein said solid-state switch has its heat sink mounted externally to said housing for improved heat dissipation.

17. Voltage monitor for monitoring the output voltage of a power source being connectable to a load, comprising: a reference voltage source, comparator means for comparing the output voltage with said reference voltage for producing an affirmative output if said output voltage is within a given range of said reference voltage; switch means being responsive to said affirmative output for connecting said load to said power source; wherein said power source includes at least one phase lead, a neutral lead and a ground lead; said comparator means has at least one phase input being responsive to the voltage on said phase lead, and a neutral input being responsive to the voltage on said neutral lead; said switch means include at least one switch disposed in said phase lead between the load and the power source, and a ground lead connecting said power source with said monitor and said load; wherein said switch is a solid-state switch; including timing means for timing the duration of presence of a given voltage condition respectively on said phase lead and said neutral lead; a logic circuit being responsive to said comparator and said timing means for producing said affirmative output; and a frequency sensing circuit connected to said power source, having a frequency dependent output operatively engaging said logic circuit for cancelling said affirmative output when said output voltage has a frequency outside a given frequency band.

18. Voltage monitor for monitoring the output voltage of a power source being connectable to a load, comprising: a reference voltage source, comparator means for comparing the output voltage with said reference voltage for producing an affirmative output if said output voltage is within a given range of said reference voltage; switch means being responsive to said affirmative output for connecting said load to said power source; wherein said power source includes at least one phase lead, a neutral lead and ground lead; said comparator means has at least one phase input being responsive to the voltage on said phase lead, and a neutral input being responsive to the voltage on said neutral lead; said switch means include at least one switch disposed in said phase lead between the load and the power source, and a ground lead connecting said power source with said monitor and said load; said switch is a solid-state switch; including timing means for timing the duration of presence of a given voltage condition respectively on said phase lead and said neutral lead; a logic circuit being responsive to said comparator and said timing means for producing said affirmative output; a frequency sensing circuit connected to said power source, having a frequency dependent output operatively engaging said logic circuit for cancelling said affirmative output when said output voltage has a frequency outside a given frequency band; a frequency reference; frequency comparator means responsive to said frequency reference and said frequency comparator means, and an AND-gate connected to said frequency comparator means for generating a frequency affirmative signal when said source frequency is within a given frequency range.

* * * * *